United States Patent Office 3,271,386
Patented Sept. 6, 1966

3,271,386
**5-AMINO-4-IMIDAZOLECARBOXAMIDE
RIBOSIDE RECOVERY PROCESS**
Hsing T. Huang, Groton, Conn., assignor to Chas. Pfizer
& Co., Inc., New York, N.Y., a corporation of Delaware
No Drawing. Filed June 1, 1964, Ser. No. 371,784
5 Claims. (Cl. 260—211.5)

This invention relates to a process for the recovery of 5-amino-4-imidazolecarboxamide riboside from aqueous solutions thereof and, more particularly, to process for the recovery of 5-amino-4-imidazolecarboxamide riboside from fermentation broths containing the same.

5-amino-4-imidazolecarboxamide riboside serves as intermediate for the enzymatic preparation of 5-amino-4-imidazolecarboxamide ribotide (Geenberg, J. Biol. Chem. 219, 423, 1956) which in turn serves as percursor for the synthesis by known methods of inosinic acid, a flavor enhancer.

5-amino-4-imidazolecarboxamide riboside is prepared most conveniently by a fermentation process. The accumulation of 5-amino-4-imidazolecarboxamide riboside by *Bacillus subtilis* (Shiro et al., Agr. Biol. Chem. 26, 785–6, 1962) and by *Escherichia coli* (Gots et al., J. Biol. Chem. 210, 395–405, 1954; Greenberg, J. Am. Chem. Soc. 74, 6307–8, 1952) has been demonstrated. Additionally, 5-amino-4-imidazolecarboxamide riboside is found to accumulate in the growing culture filtrate of *Arthrobacter albidus* sp. nov., ATCC 15243, as is described in U.S. Serial No. 321,438, filed November 5, 1963.

The 5-amino-4-imidazolecarboxamide riboside can be recovered from the fermentation medium by a variety of methods known in the art. Greenberg (J. Am. Chem. Soc. 74, 6307–8, 1952) reports a procedure for the isolation of the riboside on a small scale. A procedure adaptable to the recovery on a larger scale is described by Stetten et al., J. Biol. Chem. 161, 333 (1945). This method comprises the precipitation of all amino compounds by mercuric acetate at pH 7 to 7.5. Following decomposition of the mercuric salts by hydrogen sulfide the aqueous solution of amino compounds is extracted with peroxide-free ether, concentrated to small volume in a nitrogen atmosphere and made alkaline to remove volatile bases. The mercuric salt precipitation and decomposition is repeated and the remaining aqueous solution evaporated in vacuo to near dryness. The residue is extracted with ethanol, taken up in water and treated with ethanolic picric acid to give the picrate as yellow needles. The free riboside is isolated by ether extraction of an aqueous sulfuric acid suspension of the picrate followed by removal of the sulfate with barium hydroxide and barium carbonate. Evaporation of the filtrate to near dryness gives the riboside which is recrystallized from water.

A more convenient method for large scale recovery is that of Greenberg et al., J. Biol. Chem. 219, 411–22 1956) which comprises adsorption of all amino compounds on Norit A. The Norit A is collected, air-dried on a Büchner funnel and the filter cake eluted with 10 times its weight of ethanol:concentrated ammonium hydroxide:water (5:3:2). The eluate is concentrated in vacuo to an oil, water added and the pH brought to 10–11 by ammonium hydroxide. The alkaline solution is then percolated through a Dowex–1 formate column. The riboside is washed through with water and obtained as an oil by freeze-drying. The oil is taken up in 0.01 N hydrochloric acid, adsorbed on Dowex–50, ammonium form (a strongly acid cation exchange resin, a copolymer of styrene cross-lined with a divinyl aromatic compound, containing sulfonic acid groups; available from the Dow Chemical Co.), and eluted with 0.1 N ammonium hydroxide. The eluate is taken to dryness and the residue recrystallized from water.

These methods are all deficient for large scale recovery in one or more of the following respects. They may require a lengthy operating period, repeated handling of materials and produce unsatisfactory recoveries. Further, they do not work well when applied to fermentation broths containing substantial amounts of 5-amino-4-imidazocarboxamide riboside for large scale recovery.

There has now been found a 2-stage ion exchange recovery process which unexpectedly affords good recovery of high purity 5-amino-4-imidazolecarboxamide riboside from fermentation broths and minimizes handling of materials on both small and large scale operations. This valuable process comprises, in general, contacting the 5-amino-4-imidazolecarboxamide riboside containing fermentation broth with a strong cation exchange resin operating in the hydrogen cycle followed by elution therefrom with ammonium hydroxide. The eluate is concentrated, made alkaline and contacted with a strong anion exchange resin operating in the formate or acetate cycle. The 5-amino-4-imidazolecarboxamide riboside is removed by a water wash and recovered by suitable means.

More specifically, the process of the present invention involves the adsorption of all amino compounds present in the fermentation broth on a strong cation exchange resin such as Amberlites IR–120 and IR–112 and Dowex–50, hydrogen cycle (available from Rohm and Haas Company and the Dow Chemical Company, respectively) and Duolite C·20 and Zeo-Karb 225 (available from Chemical Process Co. and Permutit, respectively); all of which are styrene-divinyl aromatic copolymers containing functional sulfonic acid groups, followed by washing the column with water and then eluting with dilute ammonium hydroxide. The fermentation broth prior to being contacted with the strong cation exchange resin is adjusted to a pH of from about 1 to about 3. The preferred pH value is 2. The pH adjustment is accomplished by means of a suitable acid, desirably a mineral acid such as hydrochloric or sulfuric acids. The acidification is generally conducted at ambient temperature, the broth stirred, and then, if desired, centrifuged or filtered to remove the bacterial cells. Removal of the bacterial cells, while not necessary, is desirable from an economical standpoint, particularly as regards the ease of regeneration of the resin, and the operating time when this process is conducted columnwise.

The eluate thus obtained is concentrated, adjusted to pH 9–10 by the addition of an alkali metal hydroxide or preferably ammonium hydroxide, then contacted with a strong anion exchange resin, formate cycle, such as Amberlite IRA–400, Amberlite IRA–401S (available from Rohm and Haas Company), Dowex–1 and Dowex–2 (available from the Dow Chemical Company) and Deacidite FF (available from Permutit Ltd.), all of which are copolymers of styrene cross-linked with varying amounts of a divinyl aromatic compound and which contain functional quaternary ammonium groups. Such resins are described in U.S. 2,366,007 and 2,632,000. The amphoteric compounds present are adsorbed. The riboside is then washed through with water, the eluate evaporated to dryness or freeze dried and the residue recrystalized from water.

The process can be conducted batchwise, for example, merely by stirring the fermentation broth with the desired ion exchange resin. It is advantageously conducted using columns of the ion exchange resins. The use of columns minimizes the overall time of recovery and avoids excessive handling of materials.

The following examples are given by way of illustration and are not to be construed as limitations of this invention, many variations of which are possible within the scope and spirit thereof.

Example I

Inoculum for the fermenter stage is grown in a Fernbach flask containing 1 liter of medium with the following composition:

| | |
|---|---|
| Peptone _____g./liter__ | 30.0 |
| Meat extract _____do____ | 3.0 |
| Yeast extract _____do____ | 5.0 |
| Glucose _____do____ | 5.0 |
| Hypoxanthine _____mg./liter__ | 50.0 | in tap water, 1 liter; sterilized at 120° C. for 15 minutes. After inoculation from a slant of *Arthrobacter albidus* sp. nov. ATCC 15243 the flask is incubated on a rotary shaker at 28° C. for 18 hours.

Large-scale growth of culture is carried out in 4 liter glass fermenters with 2 liters of medium containing, per liter:

| | |
|---|---|
| Ammonium chloride _____g./liter__ | 5.0 |
| Dipotassium hydrogen phosphate _____do____ | 1.0 |
| $MgSO_4 \cdot 7H_2O$ _____do____ | 0.5 |
| $FeCl_3 \cdot 6H_2O$ _____do____ | 0.01 |
| $MnCl_2 H_2O$ _____do____ | 0.01 |
| Biotin _____µg./liter__ | 30.0 |
| Urea _____g./liter__ | 8.0 |
| Hypoxanthine _____mg./liter__ | 80.0 |
| Glucose _____g./liter__ | 50.0 | autoclaved at 120° C. for 30 minutes. A drop of Dow-Corning Antifoam is added to each fermenter before sterilization. After sterilization 20 g. of calcium carbonate, suspended in water (200 ml.) and autoclaved separately, is added to each fermenter. After inoculation with 100 ml. inoculum each fermenter is stirred at 1750 r.p.m., aerated at a rate of 1 volume air per 1 volume liquid per minute and incubated at 28° C. for 72 hours. Paper chromatography of clarified broth, coupled with the Bratton-Marshall test as modified by Greenberg et al., J. Biol. Chem. 219, 411–422 (1956), shows approximately 1.5 g./l. of riboside to be present.

The combined broth from 10 fermenters is filtered, brought to pH 2 with concentrated HCl and passed through a column (8 cm. x 32 cm.) containing 1600 ml. Amberlite IR–120, hydrogen cycle, at a rate of 1 liter/20 minutes. The column is washed with 2 liters of deionized water and eluted with 2 N ammonium hydroxide. Two hundred ml. fractions are taken and analyzed by paper chromatography for the presence of Bratton-Marshall positive amine. Fractions 6 to 44 are combined and evaporated in vacuo to a volume of about 100 ml.

The pH of the concentrate is raised from 7.5 to 9.5 by the addition of concentrated ammonium hydroxide. The concentrate is passed through a column, 4 cm. x 45 cm., containing about 560 ml. of Dowex–1–X8 (formate cycle). The column is eluted with water at a rate of 6 ml./minute, and fractions of 100 ml. are taken. Fractions 11 to 39 containing most of the riboside are concentrated and the crystalline product precipitated by the addition of methanol. The product is collected and dried (15.5 g.). From the mother liquor another 3.7 g. of material is obtained. Total recovery=64%.

An analytical sample, obtained by recrystallization from water, melted at 210–211° C. (dec.).

*Analysis.*—Found: C, 41.75; H, 5.76; N, 21.92%. Calculated for $C_9H_{14}N_4O_5$: C, 41.86; H, 5.46; N, 21.70%.

Example II

Six 4-liter glass fermenters are each charged with 2 liters of a nutrient medium having the following composition:

| | |
|---|---|
| D-glucose * _____g./liter__ | 50.0 |
| Urea _____do____ | 8.0 |
| Ammonium chloride _____do____ | 5.0 |
| Vitamin-free casamino acids (Norit treated acid hydrolyzed casein) _____do____ | 5.0 |
| Potassium dihydrogen phosphate _____do____ | 1.0 |
| Magnesium chloride hexahydrate _____do____ | 0.25 |
| Ferric chloride hexahydrate _____do____ | 0.01 |
| Manganese sulfate monohydrate _____do____ | 0.01 |
| D-calcium pantothenate _____do____ | 0.001 |
| Thiamine nitrate _____do____ | 0.002 |
| D-biotin _____mcg./liter__ | 100 |
| Calcium carbonate * _____g./liter__ | 10.0 |
| Hypoxanthine _____do____ | 0.100 |
| Distilled water to 80% volume *. | |

The ingredients are made up to 80% volume and added to each flask. The medium is adjusted to pH 6.5 and sterilized at 121° C. for 15 minutes. A drop of Dow-Corning Antifoam is added to each fermenter before sterilization. The D-glucose and calcium carbonate are sterilized separately as 100 g./100 ml. and 20 g./200 ml. water, respectively and added to each flask to bring to proper volume and composition.

Each fermenter is inoculated with 100 ml. inoculum of Example I, stirred at 1750 r.p.m., aerated at a rate of 1 volume air per 1 volume liquid per minute and incubated at 28° C. for 72 hours. Paper chromatography of clarified broth, coupled with the Bratton-Marshall test shows 2.0 g./l. of riboside to be present.

The broth filtrate, about 12 l. of clear solution, is adjusted to pH 2.0 and percolated through a column of Amberlite IR–120, hydrogen cycle, (8 cm. x 32 cm., approximately 1600 ml. of resin) at the rate of 1 liter/20 minutes. The column is washed with 1500 ml. water then eluted with 200 ml. of 2 N ammonium hydroxide. The eluate is collected when the pH reaches about 4.4 then freeze dried to give 25 g. of residue.

The residue is taken up in 100 ml. water, adjusted to pH 9.85 with concentrated ammonium hydroxide then placed on a 4 cm. x 45 cm. column of Dowex–1, formate cycle, 560 ml. (The formate cycle of Dowex–1 is produced by treating the chloride form with sodium formate followed by washing with water to pH 3.0.) The column is washed with 3 liters water at the rate of 6 ml./minute and 100 ml. fractions collected. The first 400 ml. contain only a trace of riboside and are discarded. The succeeding 26 fractions are combined and freeze dried. The residue is dissolved in a minimum volume of water, filtered and stored in a refrigerator. The crystalline riboside is filtered off, the filtrate treated with a small amount of charcoal, filtered and allowed to crystallize slowly in a refrigerator. The combined crops are purified further by recrystallization from a minimum volume of water (filtering if necessary to remove foreign matter), the crystals filtered, washed with methanol and desiccated. M.P. 210–211° C. Yield=18 g., 75%.

Example III

Repetition of the procedure of Example I but using Amberlite IR–120, acetate cycle, in place of Dowex–1, formate cycle, affords substantially the same recovery.

What is claimed is:

1. A process for the recovery of 5-amino-4-imidazole-carboxamide riboside from a fermentation broth containing the same which comprises contacting said fermentation broth at a pH of from about 1 to about 3 with a strong cation exchange resin in the hydrogen cycle, eluting said resin with ammonium hydroxide, concentrating the eluate, contacting said concentrate at a pH of about 9 to 10 with a strong anion exchange resin operating in either the formate or the acetate cycle, and eluting said resin with water.

2. The process of claim 1 wherein the strong anion exchange resin is operating in the formate cycle.

3. The process of claim 1 wherein the 5-amino-4-imidazolecarboxamide riboside is recovered from the aqueous eluate.

4. The process of claim 3 wherein the fermentation broth is contacted with the strong cation exchange resin at a pH of about 2.

5. The process of claim 4 wherein the fermentation broth is filtered prior to contacting it with a strong cation exchange resin.

References Cited by the Examiner

UNITED STATES PATENTS

| 2,891,945 | 6/1959 | Stark | 260—211.5 |
| 2,949,450 | 8/1960 | Stark | 260—211.5 |
| 2,970,139 | 6/1961 | Duschinsky et al. | 260—211.5 |

LEWIS GOTTS, *Primary Examiner.*

JOHNNIE R. BROWN, *Assistant Examiner.*